July 21, 1931.  S. S. McINTYRE  1,815,628
CONTROL FOR A PLURALITY OF VARIABLE PRESSURE VALVES
Filed Jan. 22, 1929  3 Sheets-Sheet 2

INVENTOR,
Sydney S. McIntyre.
BY David E. Lain,
ATTORNEY.

July 21, 1931.  S. S. McINTYRE  1,815,628
CONTROL FOR A PLURALITY OF VARIABLE PRESSURE VALVES
Filed Jan. 22, 1929   3 Sheets-Sheet 3

INVENTOR,
Sydney S. McIntyre.
BY David E. Lain,
ATTORNEY.

Patented July 21, 1931

1,815,628

UNITED STATES PATENT OFFICE

SYDNEY S. McINTYRE, OF SEDRO-WOOLLEY, WASHINGTON

CONTROL FOR A PLURALITY OF VARIABLE PRESSURE VALVES

Application filed January 22, 1929. Serial No. 334,330.

My invention relates to improvements in controls for a plurality of variable pressure valves, and has for an object to provide variation control mechanism for a plurality of variable pressure valves suitable for simultaneous operation by one hand.

Another object of my improvement is to provide said mechanism suited to open one or more of said valves to a desired amount while allowing the other of said valves to remain closed.

Another object of my improvement is to provide said mechanism suited to independently operate each of the valves controlled thereby.

Another object of my improvement is to provide said mechanism adapted to cause the desired changes in stage of said valves to occur progressively without requiring undue or sustained attention or effort of the operator.

Other objects of my improvement will appear as the description proceeds.

Figure 1:
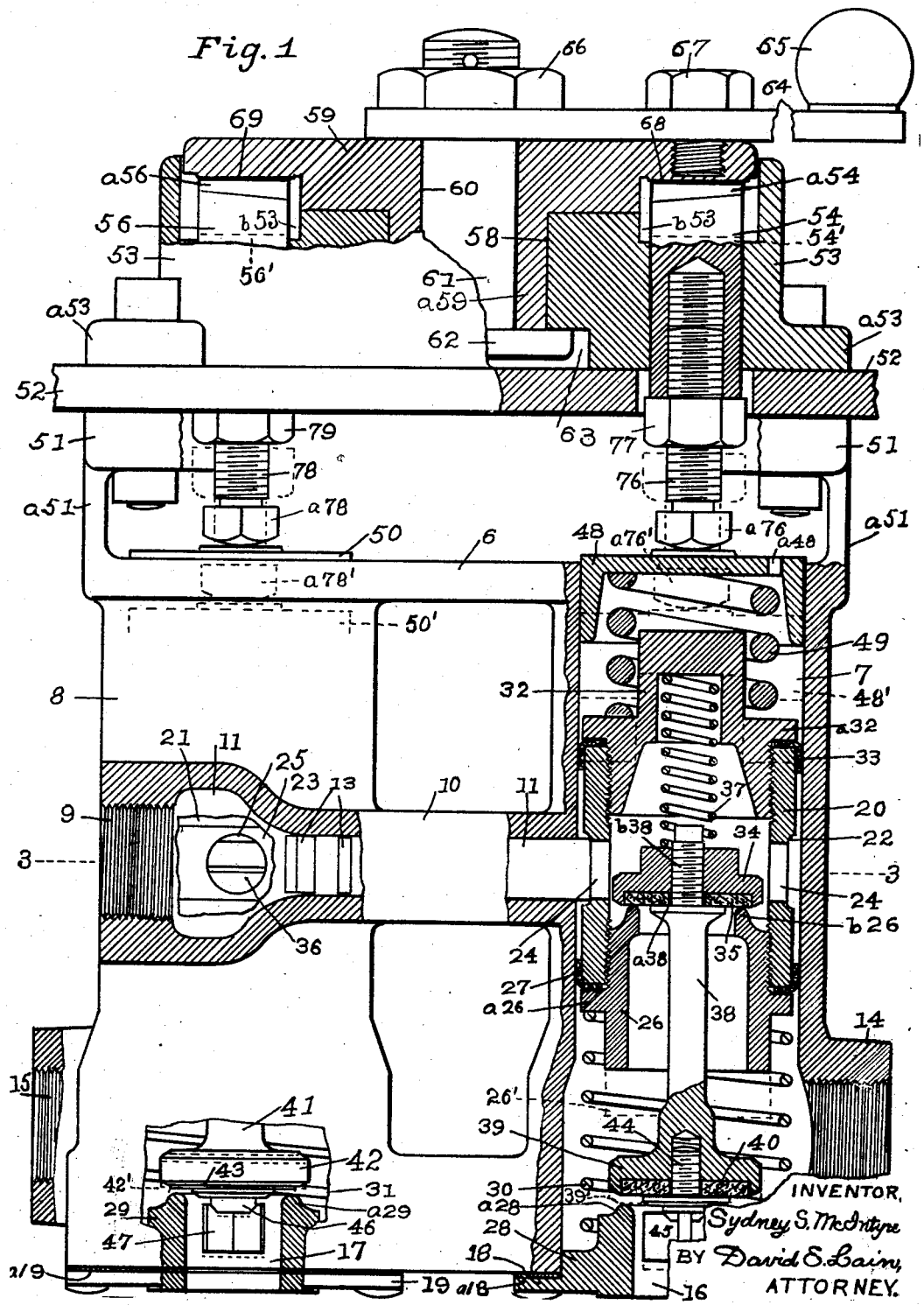
Figure 2:
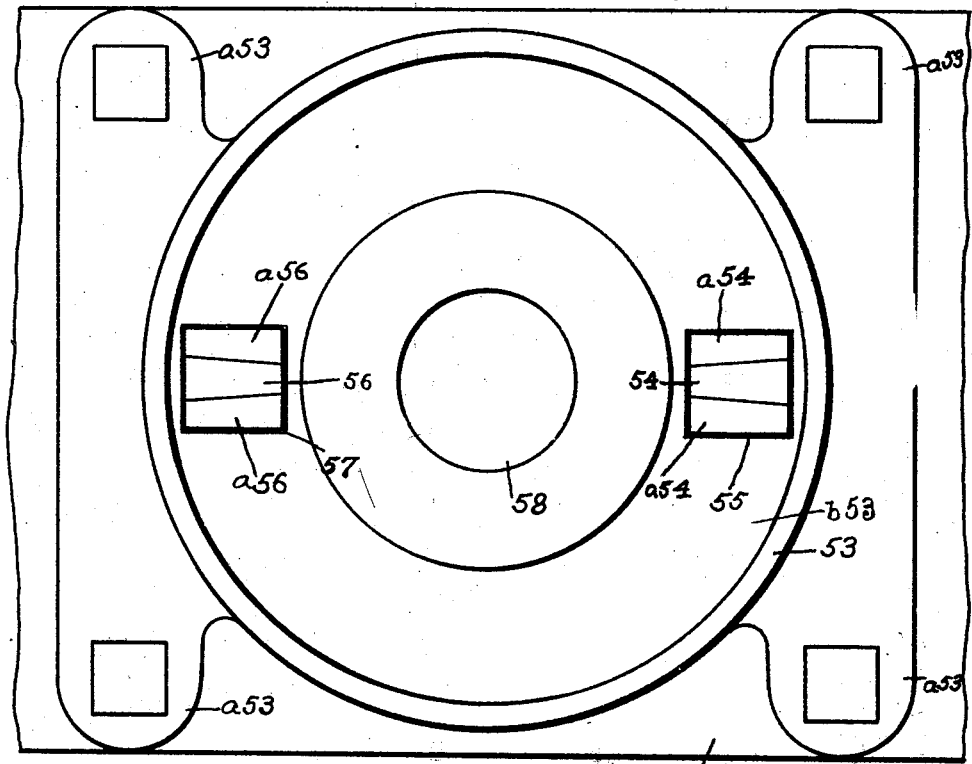
Figure 3:
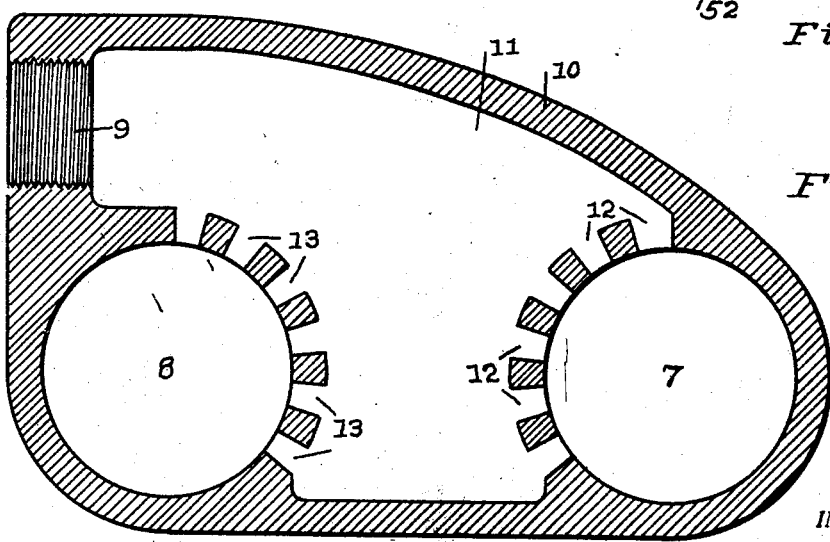
Figure 4:
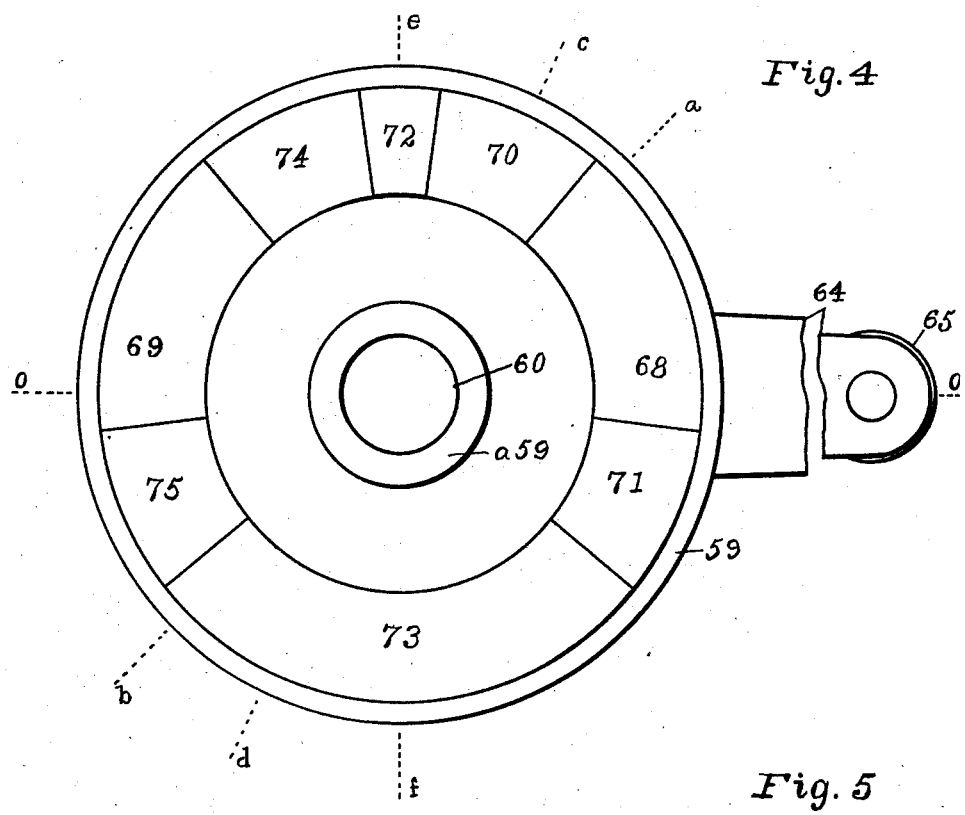
Figure 5:
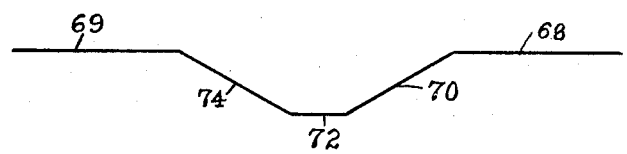
Figure 6:
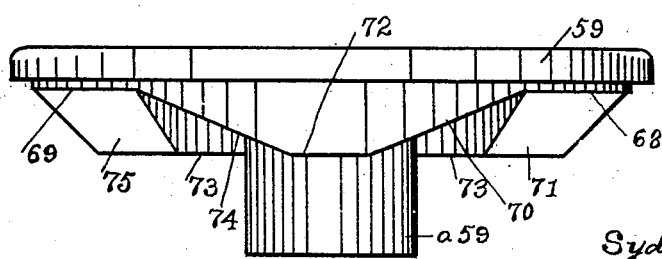

I attain these and other objects of my improvement with the mechanism illustrated in the three sheets of drawings accompanying this specification and forming a part thereof in which Figure 1 is a front elevation view of a two-cylinder variable-pressure valve block with my operating mechanism in place thereon one of the cylinders and the mechanism therein and a portion of said operating mechanism being shown in vertical cross section on a medial plane, Fig. 2 is a top plan view of Fig. 1 with the cam disc removed from its place thereon, Fig. 3 is a section of Fig. 1 on a horizontal plane through line 3—3, Fig. 4 is a bottom plan view of the cam disc, Fig. 5 is a development of the front inner semi-circumference of the bottom edge of the cam, and Fig. 6 is a side elevation of the cam.

Similar characters refer to similar parts throughout. Certain parts are broken away to show other parts hidden thereby.

With more particular reference to the designated parts: Cylinder block 6 has two parallel valve cylinders 7 and 8 both of which are supplied with pressure air from a source—not shown—through a pipe engaged in threaded inlet opening 9 which enters chamber 11 of conduit 10, preferably integral with block 6, communicating with cylinder 7 through multiple openings 12 and with cylinder 8 through multiple openings 13.

Cylinder 7 has flanged bottom 18 fastened to its lower end with washer $a18$ intervening. Exhaust outlet 16 is central in bottom 18. Cylinder 8 has flanged bottom 19 fastened to its lower end with washer $a19$ intervening, and exhaust outlet 17 is central therethrough.

Floating piston 20 is mounted in cylinder 7 for reciprocation and floating piston 21 is similarly mounted for reciprocation in cylinder 8. The side wall of piston 20 has external medial annular groove 22 therein communicating with the interior through several openings two of which are shown at 24, 24. The side wall of piston 21 has external medial annular groove 23 therein communicating with the interior through several openings one of which is shown at 25. The lower end of piston wall 20 is threaded on its interior and has the upper threaded end of sleeve 26 engaged therewith. Said sleeve has external annular boss $a26$ which bears against the lower end of the piston with the flange of packing ring 27 intervening.

Bottom 18 is extended within cylinder 7 to provide a bearing for spring 30 at 28 and to provide annular exhaust-valve seat $a28$. Bottom 19 is extended within cylinder 8 at 29 to provide a bearing for spring 31 and also to provide annular exhaust-valve seat $a29$.

Spring 30 is mounted within cylinder 7 to react between boss $a26$ and bottom 28 and supports the lower end of piston 20 with resilient pressure. Spring 31 is mounted within piston 8 between bottom 29 and the lower end of piston 21 (not shown) and supports said piston with resilient pressure.

Piston top 32 has a sleeve on its lower side which is threaded externally to engage with interior threads on the upper end of piston 20. Flange $a32$ on said piston top bears on the upper side of the flange of piston packing 33 which is thereby clamped between the upper end of piston walls 20 and said flange.

Pis'on sleeve top edge $b26$ is the valve seat for piston valve 34 which bears on said seat with washer 35 intervening. Piston 21 in cylinder 8 has inlet valve 36. Piston top 32 has an upwardly extended hollow boss within which is mounted spring 37 to react between said head and inlet valve 34.

The upper end of duplex valve rod 38 is provided with annular boss $a38$ beyond which protrudes threaded end $b38$ which is extended through a threaded hole in valve 34 to engage therewith and clamp washer 35 between said boss and valve 34. On the lower end of rod 38, preferably integral therewith, is exhaust valve 39 which may bear on valve seat $a28$ with valve washer 40 intervening. Valve stem 41 in cylinder 8 has exhaust valve 42 on its lower end. Valve 42 may bear on valve seat $a29$ with valve washer 43 intervening. Valve washer 40 is fastened to valve 39 by screw 44 and integral with the head thereof is three-wing guide 45 to reciprocate in exhaust outlet 16 and guide the movements of valve 39.

Screw 46 fastens valve washer 43 to valve 42 and its head is integral with three-wing guide 47 which may reciprocate in exhaust outlet 17 to guide the movements of valve 42. Valve 42 is shown in dotted lines seated at 42'.

Spring cap 48 is mounted loosely in the upper end of cylinder 7 for reciprocation. Spring 49 is mounted in the upper end of cylinder 7 to react between cap 48 and piston top 32. Spring cap 50 is mounted loosely in the upper end of cylinder 8 for reciprocation.

The mechanism within cylinder 8, only a part of which is shown, is preferably like that in cylinder 7 which is more fully disclosed.

Arms $a51$ project upward from the upper end of cylinder block 6 and have lugs 51 on their outer ends on which bears plate 52. Housing block 53 has feet $a53$ to bear on plate 52 vertically above lugs 51 and is fastened thereto with said plate intervening by clamping bolts extended through said lugs, plate and feet. Housing block 53 has square hole 55 therethrough the axis of which coincides with the axis of cylinder 7. In hole 55 is mounted square plunger 54 for reciprocation. Also in housing block 53 is square hole 57 the axis of which coincides with the axis of cylinder 8. In hole 57 is mounted square plunger 56 for reciprocation. Central hole 58 is parallel with holes 55 and 57 and provides a bearing for the cam disc. The upper ends of plungers 54 and 56 are disposed in annular groove $b53$.

Cam disc 59 has central boss $a59$ to mount in central hole 58 for revolution. Said cam disc also has central hole 60 through which is extended bolt 61 having head 62 of sufficiently large diameter to project beyond the lower end of boss $a59$ and bear beneath the bottom of annular recess 63 central in the bottom of block 53.

Cam handle 64 is clamped on top of the cam disc by bolt 61 and nut 66 thereon and engaged with said disc by screw 67 through a hole in said handle and extended into a tapped hole in said disc. Cam disc boss $a59$ is sufficiently long relative to bolt 61 to allow operative clearance between the bottom of the cam disc and the top of block 53 and between bolt head 62 and the proximate surface of said block, thus permitting freedom for the revolution of said disc on and in said block. Handle 64 is provided with hand knob 65.

The cam on disc 59 is an annular boss concentric with the axis of said disc and the cam surfaces preferably are plane and spiral surfaces radial with said axis. The datum or zero cam planes 68 and 69 are at opposite ends of a diameter of the disc and handle 64 is preferably central over this diameter. In Fig. 4 the central neutral line 0—0 of the cam intersects zero planes 68 and 69. The cam surfaces most distant from said zero planes are planes 72 and 73 which are preferably diametrically opposed and the surface of one, 73, is preferably more extended than the other for reasons to appear later.

Spiral surface 70 connects planes 68 and 72, spiral surface 71 connects planes 68 and 73, spiral surface 74 connects planes 69 and 72 and spiral surface 75 connects planes 69 and 73.

Diameter $a$—$b$ intersects zero plane 68 and distant plane 73. Diameter $c$—$d$ intersects spiral surface 70 and distant plane 73. Diameter $e$—$f$, drawn at right angles with zero diameter 0—0, preferably bisects distant planes 72 and 73.

The development in Fig. 5 shows the straightened inner edges of a portion of zero plane 69, spiral surface 74, distant plane 72, spiral surface 70 and a portion of zero plane 68. The upper ends of plungers 54 and 56 are planes with beveled spiral edges $a54$ and $a56$ respectively.

In a central tapped hole in the lower end of plunger 54 is engaged adjusting screw 76 retained in place at desired locations by lock nut 77. The head of screw 76, shown at $a76$, bears on top of spring cap 48. The function of screw 76 is to provide means to vary the operative length of plunger 54. Screw head $a76$ is shown in dotted lines at $a76'$ where it may be disposed by cams 72 or 73 bearing on plunger 54.

In a central tapped hole in the lower end of plunger 56 is engaged adjusting screw 78 with lock nut 79 thereon to maintain the position of the screw in the plunger in desired positions. The head $a78$ of screw 78 bears on spring cap 50. The function of screw 78 is to provide means for adjusting the length of plunger 56. Screw head $a78$ is shown in dotted lines at $a78'$ where it may be disposed when cams 72 or 73 bear on plunger 56.

Plate 52 provides means to fasten the valves to the mechanism, the operation of which they aid in controlling, or to another supporting structure.

As illustrated in full lines, zero cam plane 68 bears on top of plunger 54 and zero cam plane 69 bears on the upper end of plunger 56 and both plungers are at their upper limits.

The position of spring caps 48 and 50 provide for the springs in both cylinders being retained under slight compression with inlet valves 34 and 36 seated thus closing the valves against the air pressure maintained in chamber 11 and permitting no communication between said chamber and valve outlets 14 and 15.

Now revolve handle 64 through an angle of 90° forward causing cam plane 72 to bear on plunger 56 and cam plane 73 to bear on plunger 54, depressing plunger 54 to its dotted location at $54'$ and plunger 56 to its dotted position at $56'$. This plunger movement will carry spring cap 48 to its dotted position at $48'$ and spring cap 50 to its dotted position at $50'$ and piston 20 will be forced down till its lower end is at $26'$ while piston 21 will be depressed to a like amount. Valve stem 38 is rigid and piston valve 34 will be opened by the lowering of valve seat $b26$ allowing pressure air to pass through piston 20 and into outlet 14. In a similar manner the valve seat beneath piston valve 36 is depressed while this valve remains stationary and the pressure air passes through piston 21 and enters valve outlet 15. Now both of the variable pressure valves are fully open and the full pressure of the service air may enter the work cylinders assumed to be connected with valve outlets 14 and 15.

It may be noted that the hand of the operator may now be removed from handle 64 and its position in rotation will not change because the cam surfaces now bearing on the plungers are at right angles with the direction of their reciprocation.

Line $e$—$f$ of Fig. 4 is now parallel with the medial line of handle 64, but if said handle be rotated till its medial line is parallel with line $c$—$d$, then the central part of spiral cam surface 70 bears on plunger 54 and it will occupy a position about midway between its illustrated full-line and dotted-line positions referred to, and piston 20 will return to a midway position thus reducing the distance of valve 34 above seat $b26$. Meanwhile plunger 56 is beneath cam plane 73 and its piston 21 remains at its lower limit with valve 36 fully open. Then set handle 64 centrally over line $a$—$b$ and zero cam plane 68 will bear on plunger 54 while distant plane 73 will bear on plunger 56 thereby returning piston 20 to its full-line position, closing inlet valve 34, thus shutting off communication with the pressure air and allowing exhaust valve 39 to open. Meanwhile plunger 56 and the mechanism of variable pressure valve 8 operated thereby will remain in its fully-open position with the full pressure of the pressure air operative in the work cylinder connected with outlet 15.

In the above-named positions in rotation of cam handle 64 it has been assumed that the handle was above the locations designed by $a$, $c$, and $e$ in Fig. 4. But, if the handle were above the locations designated by $b$, $d$, and $f$ in said figure, the valve settings caused thereby would be relatively reversed.

Return handle 64 to line 0—0 and then move it in either direction to cause either of spiral surfaces 74 or 75 to bear on plunger 56. Beginning with the smallest operative opening of valve 36 caused by the depression of piston 21 due to the movement of, say, spiral surface 75 over plunger 56, this small inlet-valve opening may be maintained by retaining the handle in that position, and only a small part of the pressure in chamber 11 made available in the work cylinders assumed to be connected with valve outlet 15 or by continued revolution of the handle in a forward direction, the opening beneath piston valve 21 will be increased as spiral surface 75 is moved farther over plunger 56, and if the handle movement is continued in the same direction, cam plane 72 will be brought to bear on plunger 56 and piston valve 21 will be fully opened. Meanwhile cam plane 68 has remained over plunger 54, because of the greater length of this cam plane, and variable pressure valve 7 has remained closed.

Return handle 64 to its position shown in Fig. 4 and then revolve it through an angle of 180° which will cause cam plane 69 to bear on plunger 54 while cam plane 68 bears on plunger 56. Then with the same handle movements last above described the valve actions caused thereby will be interchanged between the two valves.

The various separate and combined valve movements easily caused by different positions in revolution of cam handle 64 fixed on cam disc 59 might be considered at greater length, but enough has been explained to clearly show that the means herein illustrated provides control of the two variable pressure valves whereby both may be maintained fully closed or fully open, either may be maintained fully open while the other is fully closed, either may be maintained fully opened or fully closed while the other is being gradually or rapidly changed from fully open to fully closed position.

Also, for the sake of simplicity of the disclosure and brevity of the description but two variable pressure valves are shown under one control mechanism. However, it is easily understood, from the above description, that a greater number of these valves may be readily placed under control of a single cam operated by a single handle.

Now consider the adjustments in length of plungers 54 and 56 made possible by extension screws 76 and 78 therein. If only one of these screws be partly withdrawn, thus lengthening the plunger of which it is a part relative to the other plunger, the valve movements caused thereby will be of greater relative latitude than said movements caused by the other plunger operating under the cam control, thus causing said one valve to provide its working cylinders with greater operative pressures before it otherwise would. By withdrawing one of said screws more fully into its plunger, thus shortening the length thereof, the valve controlled thereby comes into action relatively later and until fully opened, to a less effective degree. Also, by sufficiently shortening said plunger by said screw withdrawal, the valve controlled thereby may not be fully opened by the cam. In practice, this latter adjustment has been found useful when applied to both plungers to limit the pressure which may be delivered to the work through the valves.

From the above disclosure it is evident that floating pistons 20 and 21 are retained between springs which retain it under a balance of resilient pressures and the working pressures and effects thereof delivered through this valve can never be sharp and abrupt but always approach and recede from their maximum gradually.

The three springs in each of valves 7 and 8 preferably differ in strength; spring 49 in cylinder 7 being the strongest in this cylinder and spring 37 being the weakest. The medium-strength spring 30 is, by construction, long enough to retain exhaust valve 39 free from its seat $a28$ when all of said springs are in their relaxed state causing the several operative parts within the cylinder to assume the relative positions shown in full lines in Fig. 1, which is the condition of the apparatus following a period of use when the work cylinder exhausts through exhaust outlet 16.

For the sake of brevity, the description of operation will now be confined to the action within cylinder 7 the designating character for which is also sometimes used to refer to both this cylinder and the mechanism therein which constitute one of the variable pressure valves.

It is now apparent that the operative pressures delivered to the work cylinder will be a greater or less part of the service pressure dependent on the greater or less downward movement of plunger 54 and spring cap 48.

Yet more fundamental than the spring cap movements are the movements of piston 20 the position of which not only depends on the position in rotation of cam handle 64 but also upon the reactions of springs 49 and 30. For, as explained, while the depression of plunger 54, caused by the cam surface bearing thereon and the length of this plunger determines the location of spring cap 48, the location of piston 20 is farther varied by the operative length of spring 49 which is not only subjected to the forces above referred to which tend to compress it but also to others which will now be considered.

When the several parts are in their full-line positions of Fig. 1 pressure air from chamber 11 has no power to reciprocate piston 20 because it is confined within the chamber of the piston. Also, no pressure from said pressure air may bear on the under side of spring cap 48 through leakage or otherwise because of opening $a48$ therethrough.

When spring cap 48 is forced into the valve cylinder by pressure from plunger 54 no resistance is met except from spring 30. As stated, spring 30 is by construction weaker than spring 49 and the piston movement caused by plunger 54 is less than that of the plunger.

When handle 64 is turned to location $e$, of Fig. 4, and the cam produces its maximum movement of plunger 54 the lower end of the piston will be carried to its dotted-line position at 26′, in Fig. 1, exhaust valve 39 will be at 39′ closing exhaust outlet 16, piston valve 34 will be fully open and the full pressure of the service air will enter the work cylinder connected with valve outlet 14 and produce its maximum effect on the work piston and the mechanism connected therewith. In order to exert pressure on the work piston the air must react on the lower end of valve piston 20 and the force of this reaction together with the reaction of spring 30 must be borne by spring 49, which by construction is not strong enough to resist it without compression, and piston 20 is moved upward till valve seat $b26$ bears on inlet valve 34 closing said valve and shutting off communication between chamber 11 and said work cylinder. Exhaust valve 39 now has the work pressure bearing on its upper area, which exceeds the lower area of valve 34 now thus exposed, to aid in holding it closed and spring 49, by construction, is, as now compressed, strong enough to resist farther upward movement of the valve piston 20 allowing the exhaust valve to remain closed, and maintaining constant pressure in the work cylinder till cam handle 64 is again moved. The desired work having been accomplished, handle 64 is moved to relieve pressure on spring cap 48 and piston 20 is raised by the reacting work pressure aided by spring 30 thereby opening exhaust valve 39 and allowing the pressure air in the work cylinder to escape through exhaust outlet 16, thus removing pressure from the work piston.

Again, if the cam handle is moved over position c, say, of Fig. 4, the cam will cause exhaust valve 29 to close and piston valve 34 to be about one-half of full opening. Pressure air will again enter the work cylinder, but with less than full pressure, and the work piston will be moved on the work by the reaction between it and the lower end of valve piston 20 which again will be raised to close its valve 34 and said reduced pressure will be maintained on the work piston till relieved by another movement of the cam which will allow plunger 54 to move upward and permit spring 30 to open exhaust valve 39.

By causing oblique plane 70 of the cam to pass over plunger 54 only sufficiently to slightly open valve 34 but a small part of the service pressure will be brought to bear on the work piston but this small pressure in the work cylinder will react on valve piston 20 to close piston valve 34 and the reduced pressure will be maintained on the work piston till it is relieved by a cam movement allowing plunger 54 to rise and spring 30 to open the exhaust valve. From which it follows that the cam, which may be operated by one hand, provides for the use of any desired portion of the service pressure in the work cylinder where it may be maintained as a constant force as desired.

As stated above, variable pressure valve 8 is exactly similar to variable pressure valve 7 and, since cam 59 serves plunger 56 of the former valve as well as plunger 54 of the latter valve, any operation controlled by said cam which is possible with said valve 7 is also possible with said valve 8, and the joint control of said valves by said cam can now be fully understood.

As stated above, this application relates to means to control a plurality of variable pressure valves, while the valve mechanism, more particularly described last above, has been made the subject of application Serial No. 280677, filed May 26th, 1928.

Having thus disclosed my invention, what I claim as new therein and desire to secure by Letters Patent is,—

In apparatus of the character described, two similar variable-pressure valves each adapted to convey compressed air separately each having a piston mounted therein for reciprocation between opposing springs of unequal strength also having inlet and exhaust valves operable by the reciprocation of the pistons, two reciprocative plungers one end of each of which indirectly bears on one of the pistons with one of the stronger springs intervening, means to mount the plungers for reciprocation, an annular cam, and means to mount the cam for oscillation on an axis disposed centrally between the two plungers parallel therewith to bear on the other ends of the plungers, the annular cam having two diametrically opposite plane cam sectors of different lengths in the same plane to simultaneously bear on the plungers and fully open the pressure valves, two opposite plane cam sectors of equal length adjacent the shorter of the fully-open sectors to simultaneously bear on the plungers and fully close the pressure valves and intervening spiral cam sectors connecting the fully-open and fully-closed sectors to bear on the plungers at the same and at different levels to partly close the variable pressure valves to different extents depending upon the position of the annular cam in oscillation.

SYDNEY S. McINTYRE.